(12) United States Patent
Tang et al.

(10) Patent No.: US 10,318,067 B2
(45) Date of Patent: Jun. 11, 2019

(54) CORNER GENERATION IN A PROJECTOR DISPLAY AREA

(71) Applicant: Hewlett-Packard Development Company, L.P., Houston, TX (US)

(72) Inventors: Yun Tang, San Diego, CA (US); Jinman Kang, San Diego, CA (US); David Bradley Short, San Diego, CA (US); Daniel R Tretter, San Jose, CA (US); Kar-Han Tan, Sunnyvale, CA (US); Amit A Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 15/325,532

(22) PCT Filed: Jul. 11, 2014

(86) PCT No.: PCT/US2014/046270
§ 371 (c)(1),
(2) Date: Jan. 11, 2017

(87) PCT Pub. No.: WO2016/007167
PCT Pub. Date: Jan. 14, 2016

(65) Prior Publication Data
US 2017/0160869 A1 Jun. 8, 2017

(51) Int. Cl.
*G06F 3/041* (2006.01)
*G06F 1/16* (2006.01)
(Continued)

(52) U.S. Cl.
CPC .......... *G06F 3/0418* (2013.01); *G06F 1/1632* (2013.01); *G06F 3/0421* (2013.01);
(Continued)

(58) Field of Classification Search
USPC ........................................................ 345/175
See application file for complete search history.

(56) References Cited

U.S. PATENT DOCUMENTS

| 7,252,387 B2 | 8/2007 | Raskar et al. |
| 7,599,561 B2 | 10/2009 | Wilson et al. |

(Continued)

FOREIGN PATENT DOCUMENTS

| CN | 103035015 A | 4/2013 |
| TW | 487180 | 5/2002 |

(Continued)

OTHER PUBLICATIONS

J.C. Lee et al., "Automatic Projector Calibration with Embedded Light Sensors," Mitsubishi Electric Research Laboratories, TR2004-036, Apr. 2004, pp. 1-7.

(Continued)

*Primary Examiner* — Chineyere D Wills-Burns
(74) *Attorney, Agent, or Firm* — HP Inc. Patent Department

(57) ABSTRACT

An example processor-implemented method for generating corners of a display area is provided. The method comprises detecting a dominant line for each side of the display area, each dominant line used to identify corners, detecting sub-line segments on each side of the display area, determining a distance between the corners identified by the dominant lines and the sub-line segments on each side, and generating the corners of the display area based on the distance.

20 Claims, 10 Drawing Sheets

(51) Int. Cl.
  *G06F 3/042* (2006.01)
  *G06T 7/13* (2017.01)
  *G06T 7/90* (2017.01)

(52) U.S. Cl.
  CPC .......... *G06F 3/0425* (2013.01); *G06F 3/0428* (2013.01); *G06T 7/13* (2017.01); *G06T 7/90* (2017.01); *G06F 1/1645* (2013.01); *G06T 2207/10024* (2013.01)

(56) References Cited

U.S. PATENT DOCUMENTS

| | | | |
|---|---|---|---|
| 7,626,578 B2 | 12/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,591,039 B2 | 11/2013 | Morrison et al. | |
| 8,736,583 B2 | 5/2014 | Anderson et al. | |
| 2005/0078092 A1 | 4/2005 | Clapper | |
| 2006/0050243 A1 | 3/2006 | Huewel | |
| 2006/0209268 A1* | 9/2006 | Raskar | H04N 5/74 353/69 |
| 2007/0115397 A1 | 5/2007 | Bolas et al. | |
| 2008/0018591 A1 | 1/2008 | Pittel et al. | |
| 2009/0040396 A1* | 2/2009 | Aso | H04N 9/3185 348/744 |
| 2009/0262098 A1* | 10/2009 | Yamada | G06F 1/1616 345/175 |
| 2010/0103330 A1* | 4/2010 | Morrison | G06F 3/0412 348/744 |
| 2011/0175840 A1* | 7/2011 | Mason | H05B 37/02 345/173 |
| 2011/0210961 A1* | 9/2011 | Bendall | G06T 7/0004 345/419 |
| 2011/0242054 A1 | 10/2011 | Tsu | |
| 2012/0063698 A1 | 3/2012 | Aso | |
| 2012/0313910 A1* | 12/2012 | Haraguchi | H04N 9/3179 345/207 |
| 2013/0077236 A1 | 3/2013 | Becze et al. | |
| 2013/0121601 A1* | 5/2013 | Yu | G06T 7/00 382/224 |
| 2014/0055560 A1* | 2/2014 | Fu | G06T 5/005 348/42 |
| 2014/0100694 A1 | 4/2014 | Rueckl et al. | |
| 2014/0327656 A1* | 11/2014 | Takeda | G06F 3/0421 345/175 |
| 2014/0362052 A1* | 12/2014 | McCaughan | G06F 3/0418 345/175 |
| 2015/0138225 A1* | 5/2015 | Minato | G06T 11/60 345/593 |
| 2017/0032214 A1* | 2/2017 | Krenzer | G06K 9/00335 |

FOREIGN PATENT DOCUMENTS

| | | |
|---|---|---|
| TW | 200536384 A | 11/2005 |
| WO | WO-92/15084 A1 | 9/1992 |
| WO | WO-9215084 A1 * | 9/1992 .......... G06F 3/0425 |
| WO | WO-2013/108032 A1 | 7/2013 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

* cited by examiner

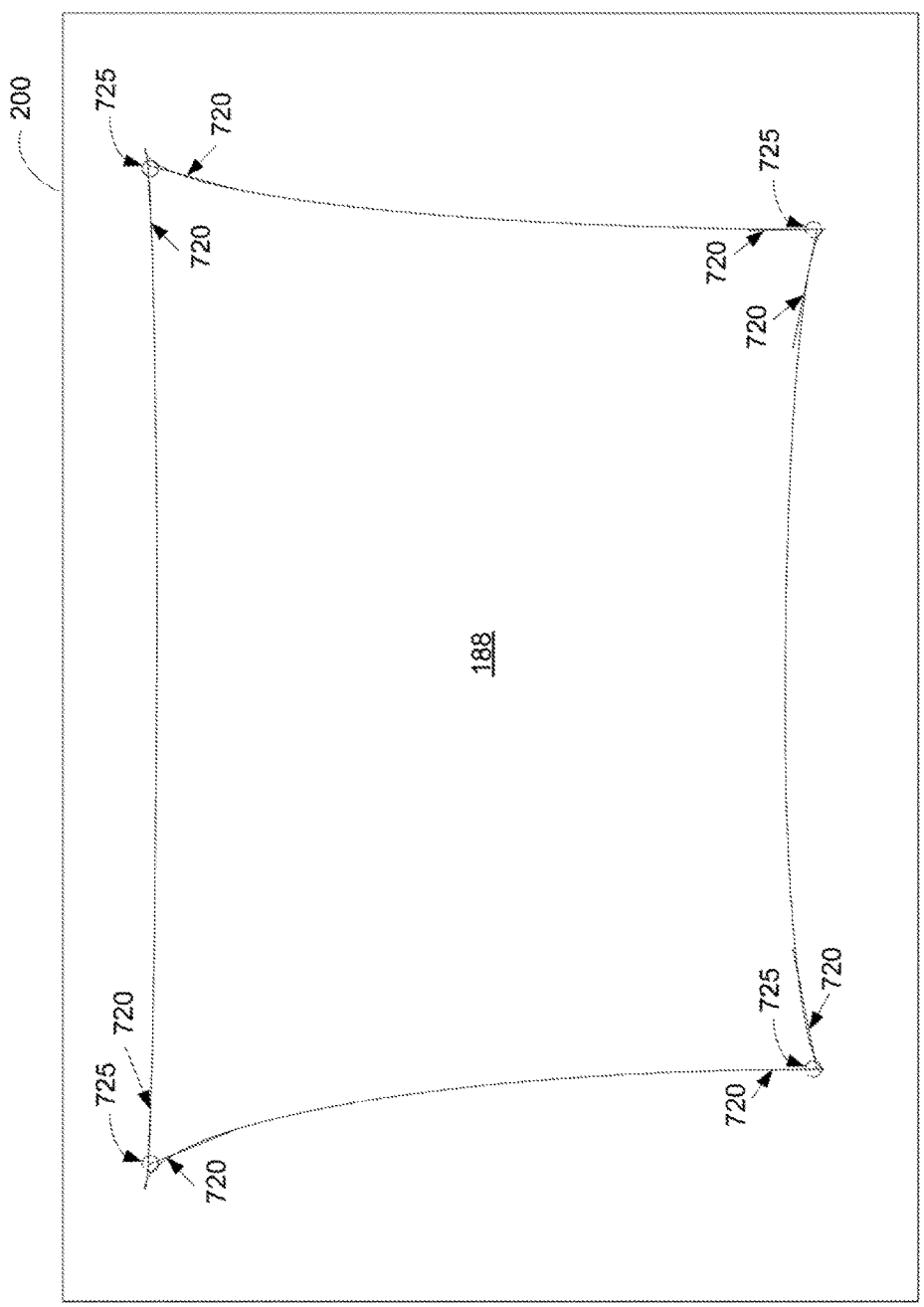

US 10,318,067 B2

CORNER GENERATION IN A PROJECTOR DISPLAY AREA

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations. However, optimum ergonomic placement of a display for simply viewing an image thereon is often at odds with such placement for engaging in touch interaction therewith. Thus, users desiring to use a single computer system for both traditional viewing applications as well as touch interactive application often encounter difficulties in positioning and/or utilizing such systems.

BRIEF DESCRIPTION OF THE DRAWINGS

For a detailed description of various examples, reference will now be made to the accompanying drawings in which:

FIG. 8A-C provide examples of the detection of the corners of the projector display space in accordance with the principles disclosed herein;

NOTATION AND NOMENCLATURE

Figure 1:
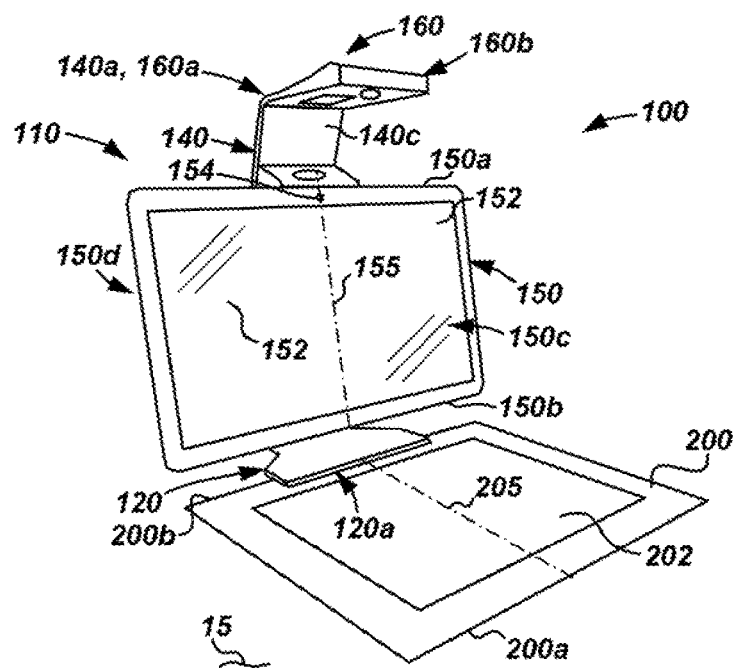
FIG. 1 is a schematic perspective view of an example of a computer system in accordance with the principles disclosed herein.
Figure 2:
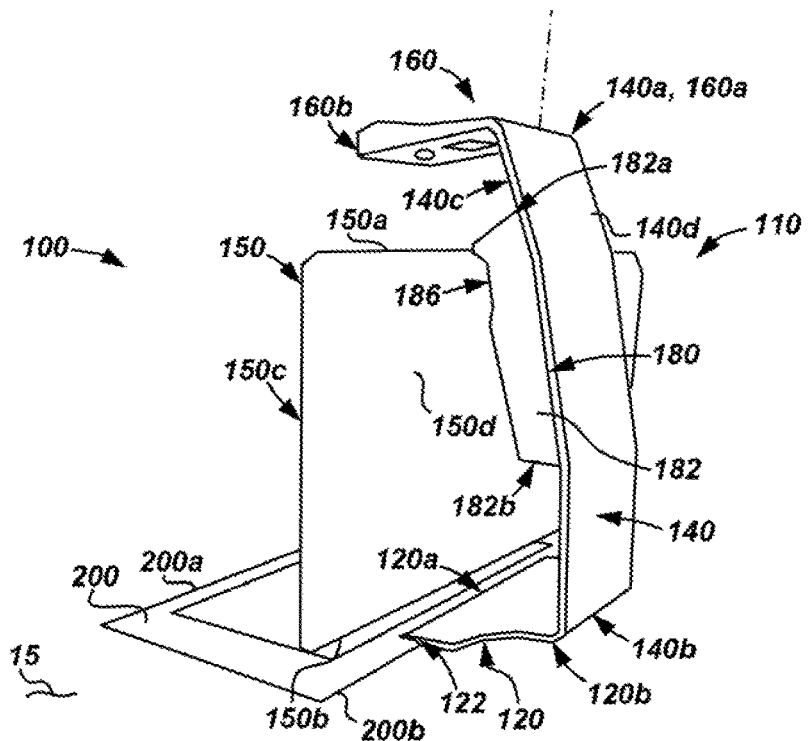
FIG. 2 is another schematic perspective view of the computer system of FIG. 1 in accordance with the principles disclosed herein.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition, as used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Referring now to FIGS. 1-4, a computer system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI. BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
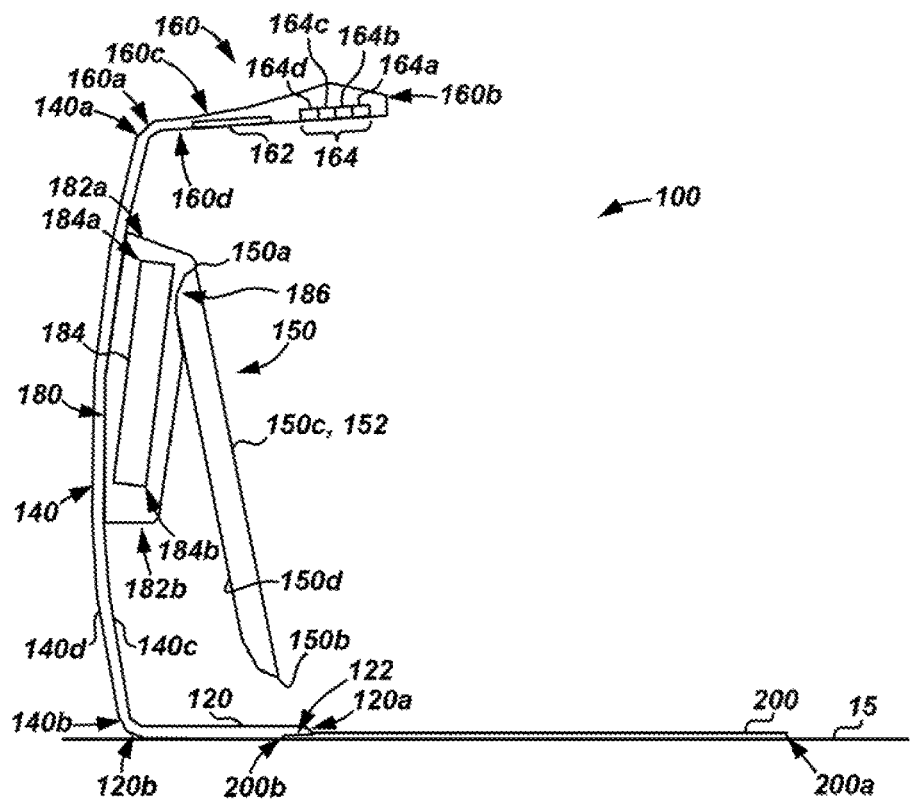
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general, member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
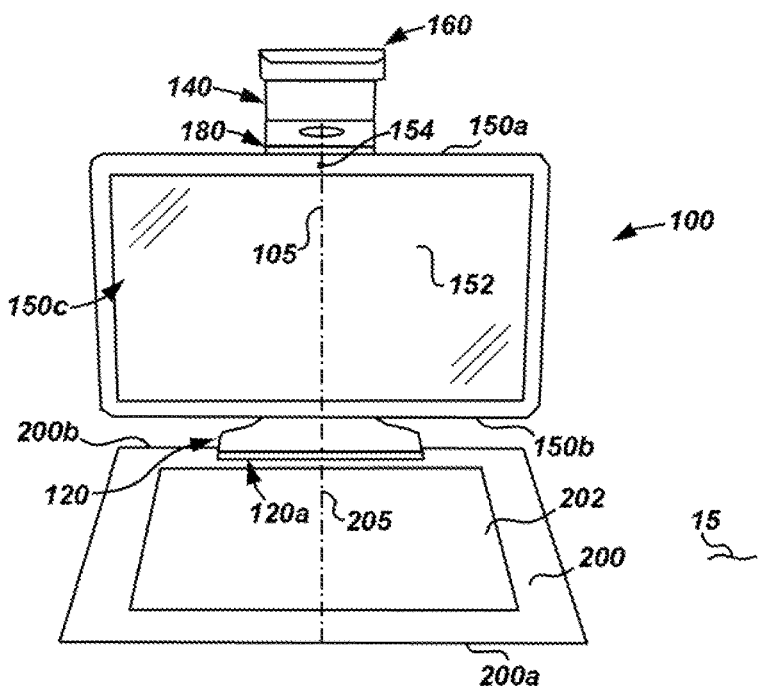
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex spherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d. Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
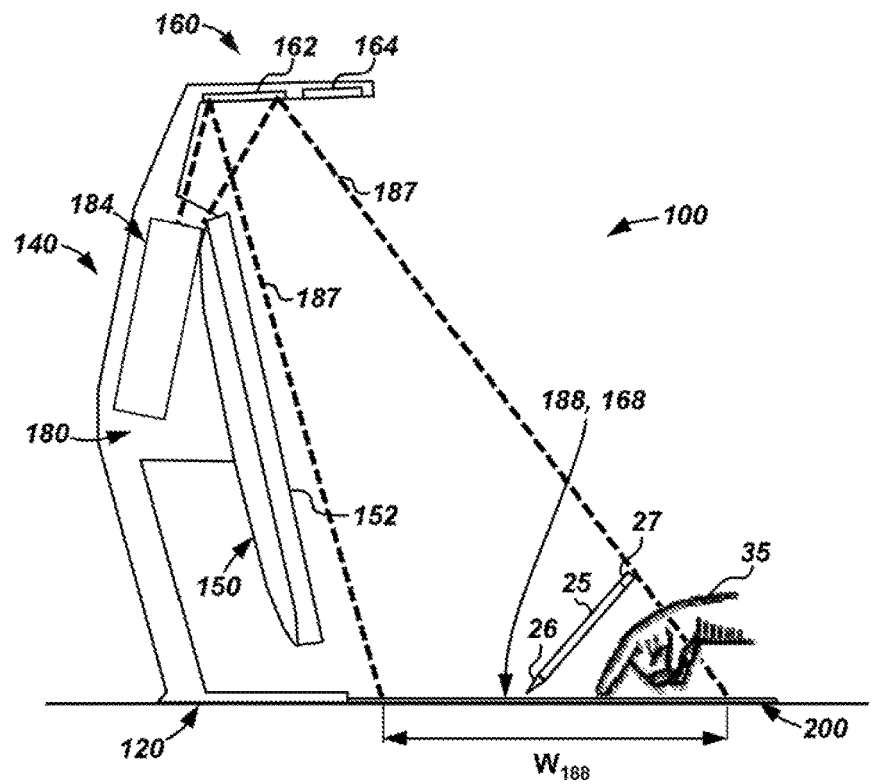
FIG. 5 is a schematic side view of the computer system of FIG. 1 during operation in accordance with the principles disclosed herein.
Figure 6:
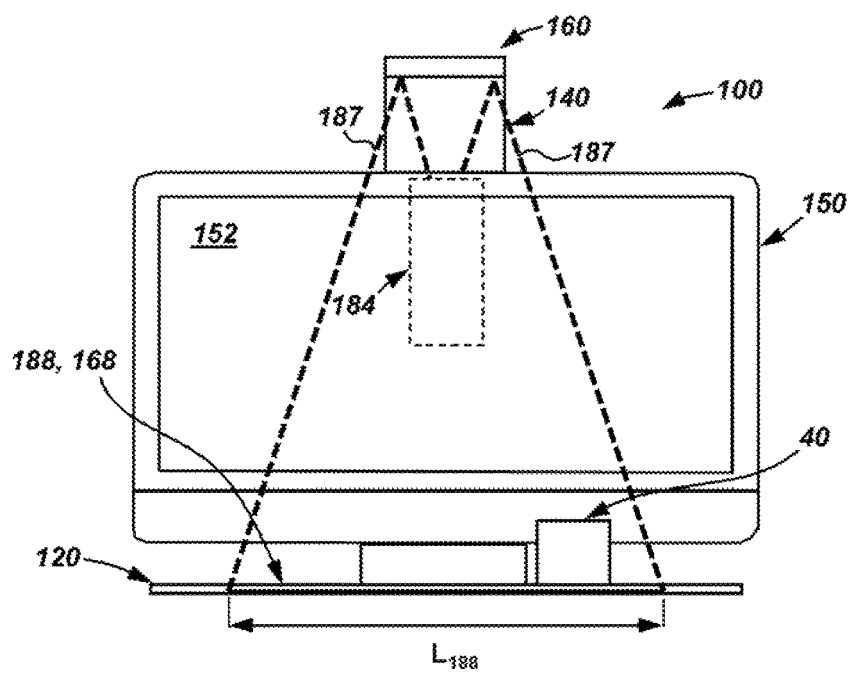
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described.

In some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as, direct interaction with a user's hand 35, through a stylus 25, or other suitable user input device(s).

Figure 7:
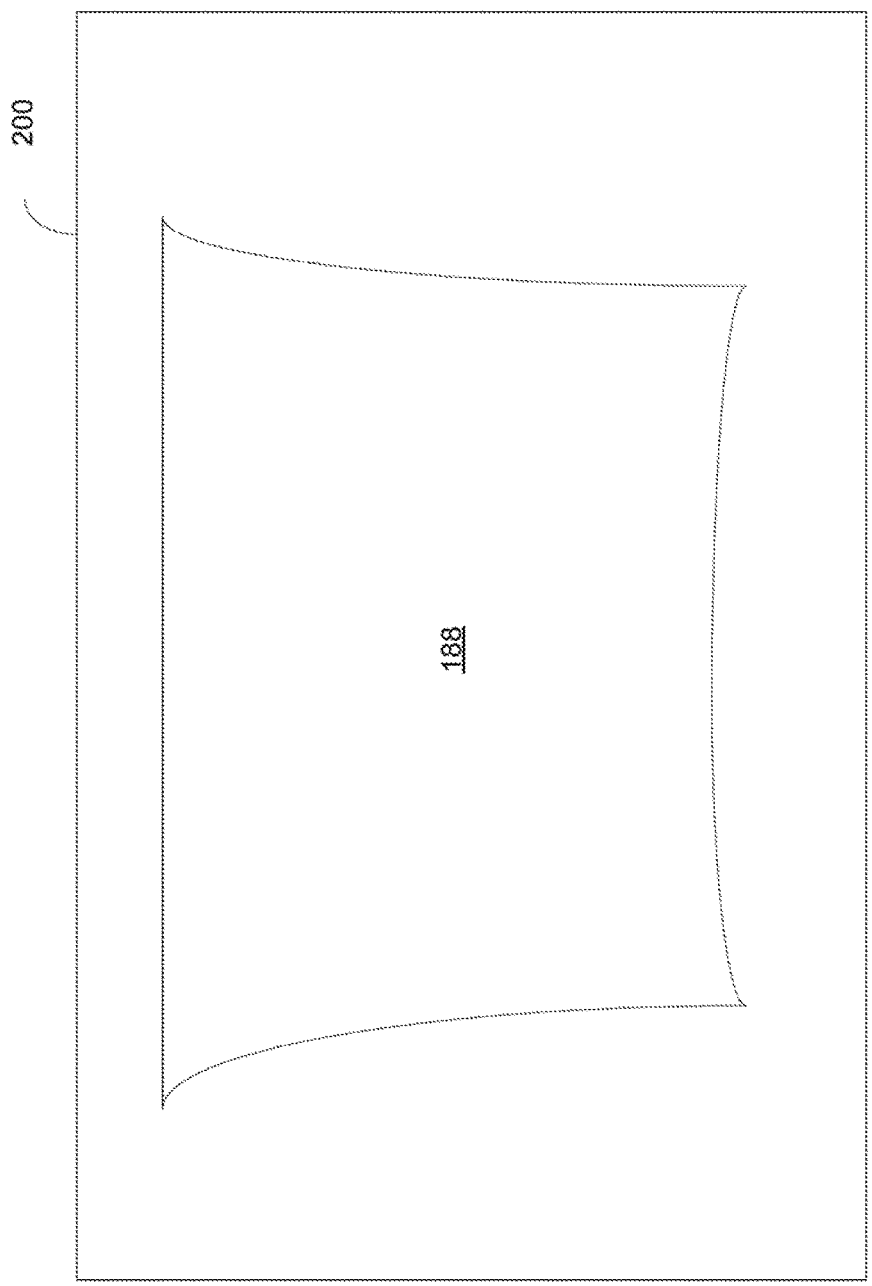
FIG. 7 provides examples of the projector display space no longer coincident with the touch sensitive surface of the touch sensitive mat in accordance with the principles disclosed herein.

In some examples, both space 188 and space 168 coincide or correspond with surface 202 of mat 200, previously described, to effectively integrate the functionality of the touch sensitive surface 202, projector assembly 184, and sensor bundle 164 within a defined area. Referring to FIG. 7, the projector display space 188 may coincide with the touch sensitive surface 202 of the touch sensitive mat 200, such that a border of the space 188 falls just within a border of the surface 202.

Although the computer system 100 may be delivered to a user with factory calibrated settings, misalignment of various components of the system 100 may occur due to various reasons, such as a loose connection, mechanical conditions, or user interaction. As an example, changes in temperature may cause components of the system 100, such as the touch sensitive surface 202 of the mat 200, to thermally expand or contract, resulting in potential misalignment with respect to other components of the system 100 (e.g., the projector assembly 184 and/or the sensor bundle 164).

Misalignment of one or more components of the system 100 may affect the integrated functionality of the touch sensitive surface 202, projector assembly 184, and sensor bundle 164 within a defined area (e.g., the surface 202). For example, sensors of the sensor bundle 164 may inadvertently change positions with respect to the touch sensitive surface 202 and/or the projector assembly 184, positioning of the surface 202 may inadvertently change with respect to the sensor bundle 164 and/or the projector assembly 184, or both the sensor bundle 164 and the surface 202 may inadvertently change positions with respect to the projector assembly 184.

FIG. 7 provides examples of the projector display space 188 no longer coincident with the touch sensitive surface of the touch sensitive mat 200. As an example, the portions of the space 188 may be distorted, and the borders of the projector display space 188 may not be straight lines under a system with optical distortion as shown in FIG. 7. The projector display space 188 is shown as a trapezoid shaped area with distorted borders. Although the computer system 100 may be delivered to a user with factory calibrated settings, the system 100 may include a program for verifying alignment of the components within the system 100 with respect to each other. The program may be initiated by software executing within the device 150. As an example, the program may verify whether the touch sensitive mat 200 is properly aligned with respect to other components, and whether the sensor bundle 164 is calibrated properly with respect to the projector assembly 184, as will be further described. As an example, the verification program may be executed regularly (e.g., once a week), at power up of the system 100, or upon a reconnection of the mat 200. If misalignment of components within the system 100 is detected, calibration operations may be performed. In such situations, the system may run a calibration method to align the projector display space 188 with the touch sensitive surface. As a part of the method, corner detection may be performed. More specifically, corner detection for calibration may need to be performed accurately and robustly under ambient lighting, and non-ideal conditions including system/optical distortion and/or object occlusion. The corner detection may generate precise projector display that aligns to the touchmat border, and generate accurate homography calibration between the sensor and the projector. This will be explained in more detailed in FIGS. 8A, 8B and 9.

Figure 8A:
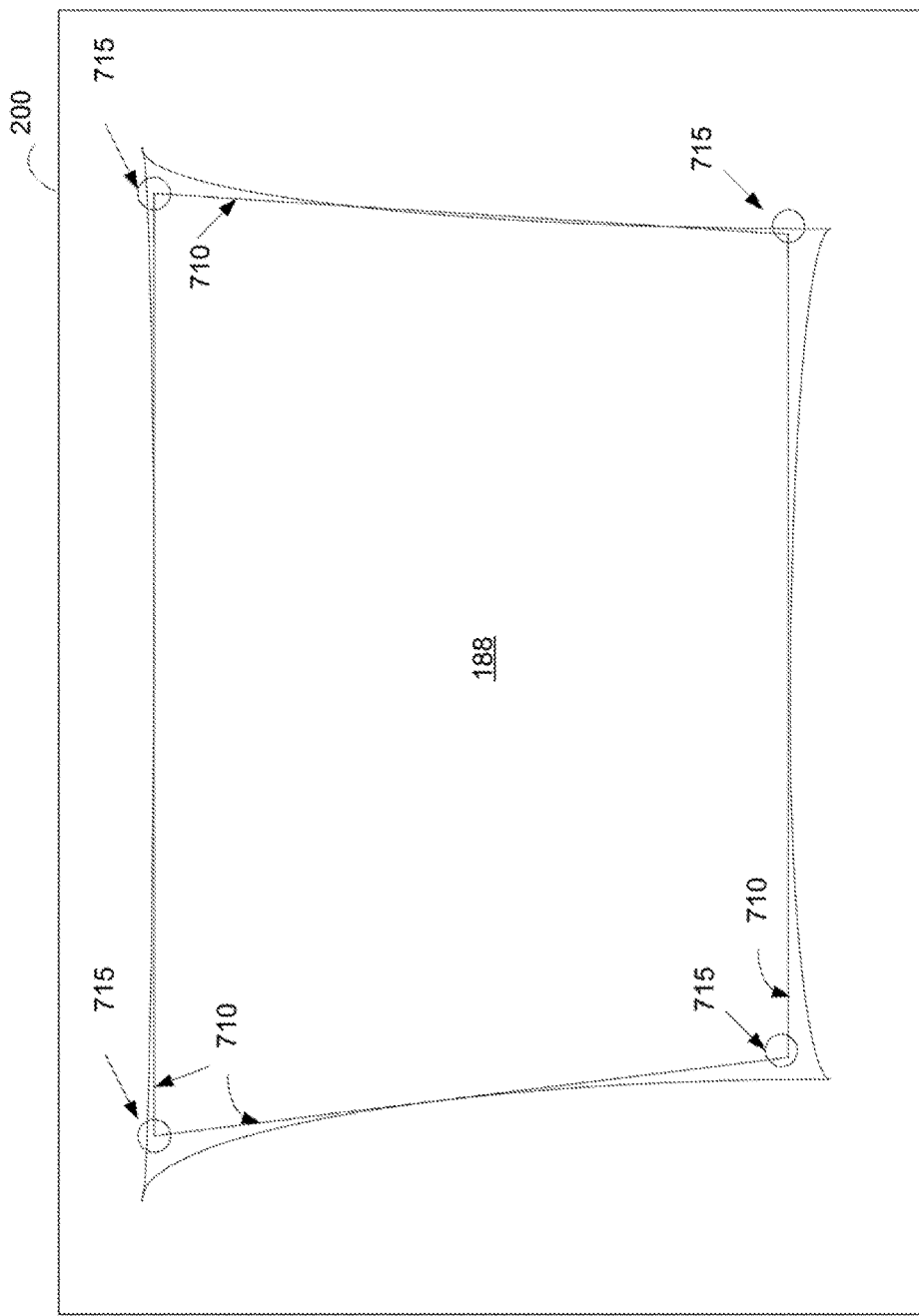

Referring to FIG. 8A, the border of the projector display space 188 may be distorted, which results in being displaced from the border of the touch sensitive surface due to misalignment of one or more components of the system 100. As an example for the distortion, inadvertent changes may have been made to the positioning of the projector assembly 184 (e.g., due to mechanical or thermal conditions). In such example, corners of the projector display space 188 may need to be determined in order to align components of the computer system 100 in order to effectively integrate the functionality of the touch sensitive surface of the mat 200, projector assembly 184, and sensor bundle 164 within a defined area.

In one example, in order to accurately detect the four corners of the projector display space 188, dominant lines 710 may be determined. For example, the system may use a probabilistic-based Hough line detection algorithm as an initial (e.g. rough) detection to identify a line segment which matches closest to the projector display edge. Such line segment is considered to be the dominant line, which may be defined as a line candidate generated by the best line-fitting with the majority of the edge points in the projector display space 188 based on edge detection. In one implementation, a color intensity method may be used for edge detection. More specifically, sensors from the sensor bundle 164 may be used for differentiating a color intensity of the projector display space 188 from color intensity of an area outside the space 188. Histogram equalization may be performed on the regions of interest to obtain high and low thresholds for an edge detection algorithm (e.g., Canny edge detection). Upon running the edge detection algorithm, edge points indicating the perimeter of the projector display space 188 may be extracted (e.g., edge points for all four sides of the space 188). As discussed earlier, a line fitting algorithm may be used for determining four fitted lines, which may be representative of the perimeter of the projector display space 188. It should be noted that this line detection/fitting approach is deterministic and repeatable unlike a non-deterministic algorithm (e.g., RANdom SAmple Consensus (RANSAC), which is produces a reasonable result only with a certain probability, with this probability increasing as more iterations are allowed).

In one implementation, this is performed for each side of the projector display space 188. As shown in FIG. 8A, the corners 715 are determined based on the dominant lines. Further, in another implementation, if the edge is completely covered by an object (e.g., object occlusion), the system may display an error message.

Referring to FIG. 8B, in order to increase the accuracy of corner detection, two subline segments 720 may be defined for each edge. A subline segment may be defined as a line hitting close to the two corners on each side of the projector display space 188 by fitting of edge points of a smaller region. More specifically, as described earlier in reference to FIG. 8A, a probabilistic-based Hough line detection algorithm as an initial (e.g. rough) detection to identify a line segment which matches closest to the projector display edge. The subline segments may be used because fitting a long edge to a single line may lose accuracy on either corner due to the nonexistence of straight lines under a system with optical distortion. As a result, the corners 725 may be detected. In one example, the system checks the distance from corners generated by the dominant lines (e.g., corners 715) to each of the two subline segments. If the distance is above an acceptability tolerance, the system 100 may use the dominant lines to define the corners of the projector display space 188. However, if the distance between the corners (e.g., 715) and the subline segments (720) is below an acceptability tolerance, the system 100 may choose to use the subline segments 720 in order to define the corners of the projector display space 188. In one implementation, the distance may be measured in pixels.

Figure 8C:
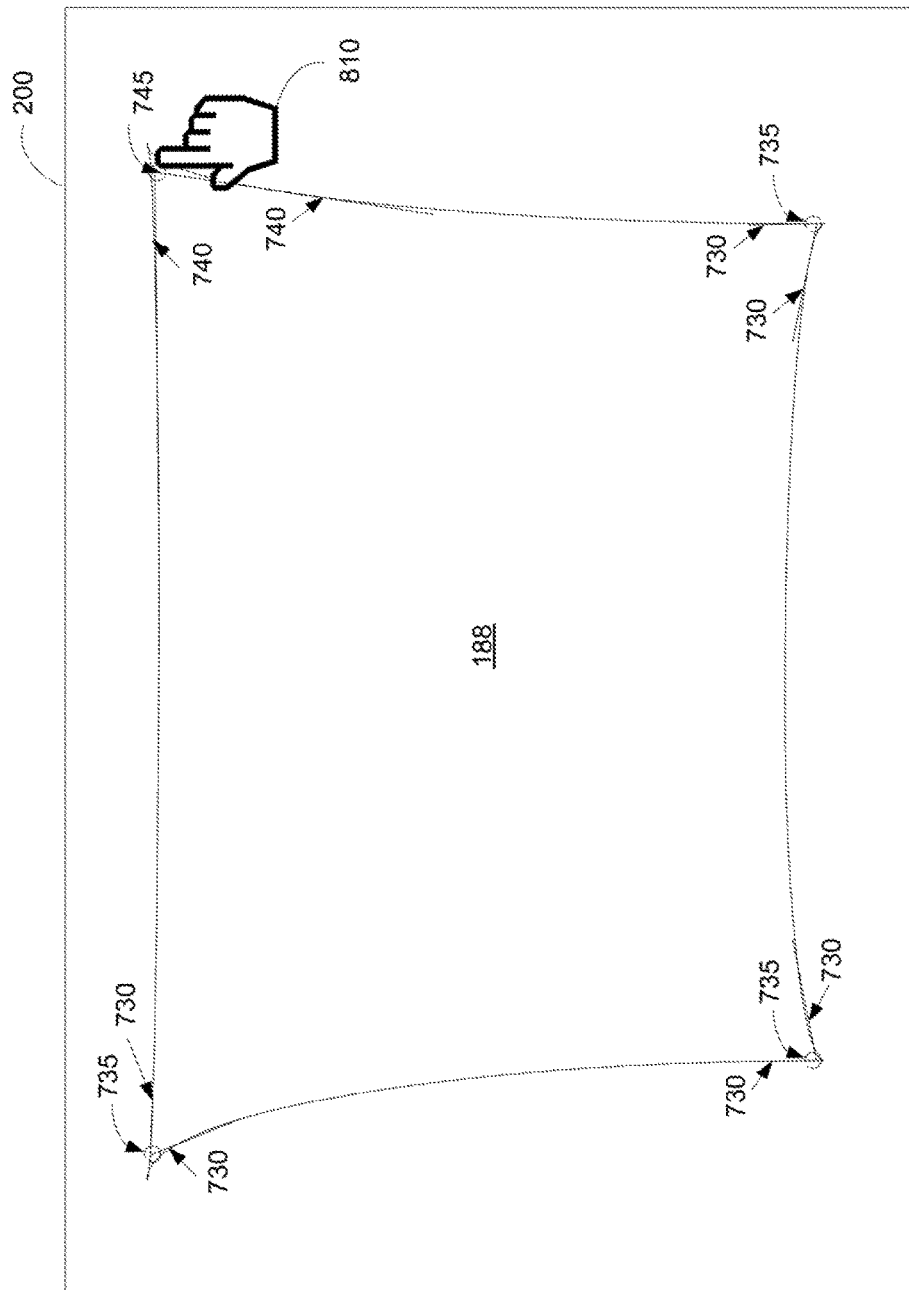

FIG. 8C illustrates another example of the detection of the corners of the projector display space in accordance with the principles disclosed herein. Different from FIGS. 8A and 8B, FIG. 8C illustrates a hand 810 occluding one of the corners of the projector display space 188. It should be readily apparent that the hand 810 is used as an example, and that anything (e.g., object, shadow) that blocks a part of the projector display space 188 may apply. In one implementation, object occlusion may be shadow, stains or physical objects on the touchmat or projector display area. Further, the hand 810 is shown to result in 25% occlusion on the top right corner of the projector display space 188. It should be noted object occlusion may be different in different implementation. In other example, the blockage could be on any or multiple of the corners of projector display space 188, and the occlusion may be less or more than 25%. For example, in one implementation, the object occlusion may be small, which is defined as an occlusion covering one or two corners (e.g., 5-10% of edge). In another implementation, the object occlusion may be medium, which is defined as an occlusion covering up to 30% of edges. In a further implementation, the object occlusion may be large, which is defined as an occlusion covering above 30% of edges. Object occlusion may apply to both the touch sensitive mat 200 and the projector display space 188.

FIG. 8C illustrates detected corners 735 and 745 for the projector display space 188. The corners 735 are generated accurately by the intersection of sublines 730 around the corners 735, similar to the approach described in greater detail in reference to FIG. 8B. The top right corner 745, which is partially occluded by the hand 810, is generated by using the top dominant line and right dominant line 740, similar to the approach described in greater detail in reference to FIG. 8A.

In another implementation, the projector display space 188 may have borders that are straight. More specifically, the projector display space 188 may be a trapezoid shaped area with undistorted sides (e.g., straight lines). In such an implementation, the dominant lines and the sublines are almost the same. For example, the position difference may be measured to be found at 0.5 mm or less.

Figure 9:
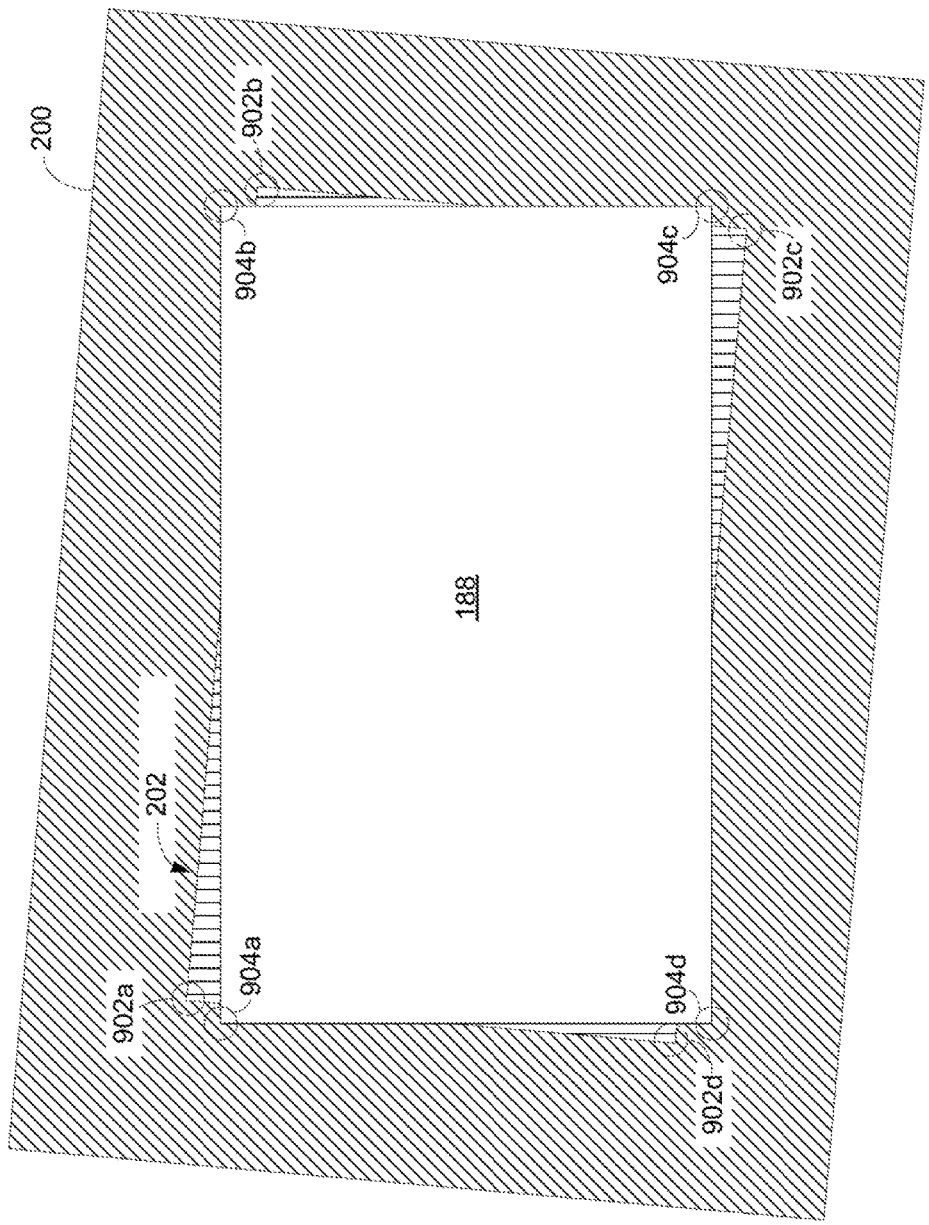
FIG. 9 provides another example of the detection of the corners of the projector display space and the touch sensitive surface in accordance with the principles disclosed herein.

FIG. 9 illustrates examples of the projector display space 188 no longer coincident with the touch sensitive surface 202 of the touch sensitive mat 200. In this example, the projector display space 188 is shown as an undistorted trapezoid shaped area. In another implementation, the projector display space 188 may be distorted, similar to the examples illustrated in FIGS. 7, 8A and 8B. Referring to FIG. 9, the touch sensitive mat 200 is rotated, for example, by 5 degrees, such that the surface 202 of the mat 200 is misaligned with respect to the space 188. As an example, the mat 200 may be inadvertently rotated due to user interaction with the mat 200 or a loose connection. The portions of the space 188 that are no longer within the touch sensitive surface 202 of the mat 200 may not be responsive to interactions from a user, for example, via the user's hand 35 or stylus 25.

Sensors from the sensor bundle 164 (e.g., color camera 164b, IR camera, or depth sensor 164c) may be used to detect the dominant lines around corners of the touch sensitive surface 202 (e.g., 902a-d) and corners of the projector display space 188 (e.g., 904a-d), according to an example. Referring to the detection of the corners 902a-d of the touch sensitive surface 202, camera 164b may be used to take either a still image or a video of the whole mat 200, or at least relevant portions of the mat 200. As explained before in reference to FIGS. 8A and 8B, a histogram of the image/video may provide regions of interest, generally providing an indication of the difference in color intensity between color of the touch sensitive surface 202 (e.g., color 702) and color of the border of the mat 200 surrounding a perimeter of the surface 202 (e.g., color 704). Histogram equalization may be performed on the regions of interest to obtain high and low thresholds for an edge detection algorithm (e.g., Canny edge detection). Upon running the edge detection algorithm, edge points indicating the perimeter of the touch sensitive surface 202 may be extracted (e.g., edge points for all four sides of the surface 202). A line fitting algorithm may be used for determining four fitted lines, representing the dominant lines. Intersection of two dominant lines may be used for calculating each corner 902a-d. When the still image of the mat 200 is captured by the color camera 164b, the corners 902a-d of the touch sensitive surface 202 may be determined even if one or more of the corners is occluded by an object in the still image (e.g., an object resting on the mat 200). This may be made possible due to the other portions of the mat 200 that is captured in the still image that represents the difference in color intensities between the two regions.

Similarly, as described earlier in reference to FIGS. 8A and 8B, a dominant line detection method may be performed for detecting dominant lines and then identifying 904a-d of the projector display space 188. For example, sensors from the sensor bundle 164 may be used for differentiating a color intensity of the projector display space 188 from a color intensity of an area outside the space 188.

Further, the system may move forward with detecting subline segments for both the projector display space 188 and the touch sensitive surface 202. As mentioned above, the dominant lines and the sublines are almost the same in this example since the borders of both the projector display space 188 and the touch sensitive surface 202 are straight due to the limited distortion of these spaces. For example, the position difference may be measured to be found at 0.5 mm or less. Accordingly, the system may generate the corners of both the projector display space 188 and the touch sensitive surface 202 based on either dominant lines or subline segments, which result in the same corner locations.

In a further implementation, upon detecting the corners 902a-d of the touch sensitive surface 202 and the corners 904a-d of the projector display space 188, correspondence between the two sets of corners may be determined, based according to mapping methods, such as homography. As an example, based upon the correspondence between the two sets of corners, the projector 184 may adjust settings for the border of the image reflected on to the mat 200 (e.g., border of the projector display space 188) to fit within the detected border of the mat 200 (e.g., the touch sensitive surface 202). In another implementation, the corners 902a-d of the touch sensitive surface 202 may be reversely mapped to the corners 904a-d of the projector display space 188 for realigning mapping between the projector assembly 184 and the touch sensitive mat 200 (e.g., via homography). As an example, vector offsets may be generated between the two sets of corners in order to determine any correspondence. Based upon the differences detected between the two sets of corners, calibration operations may be performed (e.g., automatic and/or manual) on one or more components of the system 100. If the misalignment between the two sets of corners is above an acceptability tolerance, the system 100 may inform the user to disconnect and reconnect the mat 200 by aligning the mat 200 with the base 120 of structure 110, as previously described to ensure proper alignment thereof. However, if the misalignment between the two sets of corners (e.g., 902a-d and 904a-d) is below an acceptability tolerance, but above a usability tolerance, the system 100 may automatically recalibrate in order for the border of the projector display space 188 to coincide with the border of the touch sensitive surface 202. As an example, the automatic recalibration may occur adjusting firmware settings of the project 184.

Although the use of different colors are described with reference to FIG. 9 for differentiating the touch sensitive surface 202 from the border of the mat 200, different materials may be used instead between the two regions of the mat 200. For example, the border of the mat 200 may be coated with an IR-absorbing material for detection of the border by a sensor from the sensor bundle (e.g., IR camera). Upon detection of the border of the mat 200, the touch sensitive surface 202 may be differentiated from the border, and an edge detection algorithm may be used, as described above, for detecting the four corners 902a-d of the touch sensitive surface 202.

Computing device 150 may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Figure 10:
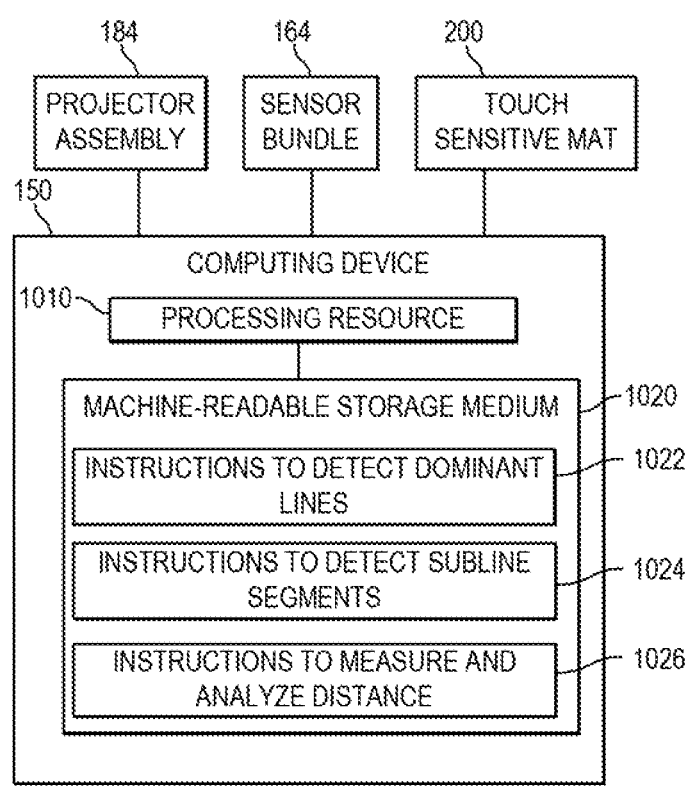
FIG. 10 is a block diagram depicting a memory resource and a processing resource in accordance with the principles disclosed herein.

FIG. 10 is a block diagram of an example computing device 150. In the example of FIG. 10, computing device 150 is communicatively connected to projector assembly 184, sensor bundle 164, and touch sensitive mat 200 (as described above), and includes a processing resource 1010, and a machine-readable storage medium 1020 comprising (e.g., encoded with) instructions 1022, 1024, and 1026. In some examples, storage medium 1020 may include additional instructions. In other examples, instructions 1022, 1024, 1026, and any other instructions described herein in relation to storage medium 1020, may be stored on a machine-readable storage medium remote from but accessible to computing device 150 and processing resource 1010. Processing resource 1010 may fetch, decode, and execute instructions stored on storage medium 1020 to implement the functionalities described below. In other examples, the functionalities of any of the instructions of storage medium 1020 may be implemented in the form of electronic circuitry, in the form of executable instructions encoded on a machine-readable storage medium, or a combination thereof. Machine-readable storage medium 1020 may be a non-transitory machine-readable storage medium.

In the example of FIG. 10, a computing system, such as computing system 100 described above in relation to FIG. 1, may comprise computing device 150, projector assembly 184, sensor bundle 164, and touch sensitive mat 200. In some examples, instructions 1022 may include instructions for detecting dominant lines based on a border of a projector display surface. As an example, instructions for detecting the border may include running a probabilistic-based Hough line detection algorithm to identify a line segment which matches closest to the projector display edge. Instructions 1024 may include instructions for detecting subline segments, and instructions 1026 may include instructions for measuring distance between corners determined based on the dominant lines and the subline segments. Moreover, the instructions 1026 may include analyzing the distance to determine whether it is within a predetermined tolerance level. The storage medium 1020 may include additional instructions to realign mapping between the border of the image reflected by the projector onto the projector display space on the touch sensitive mat, and the border of the touch sensitive mat.

Figure 11:
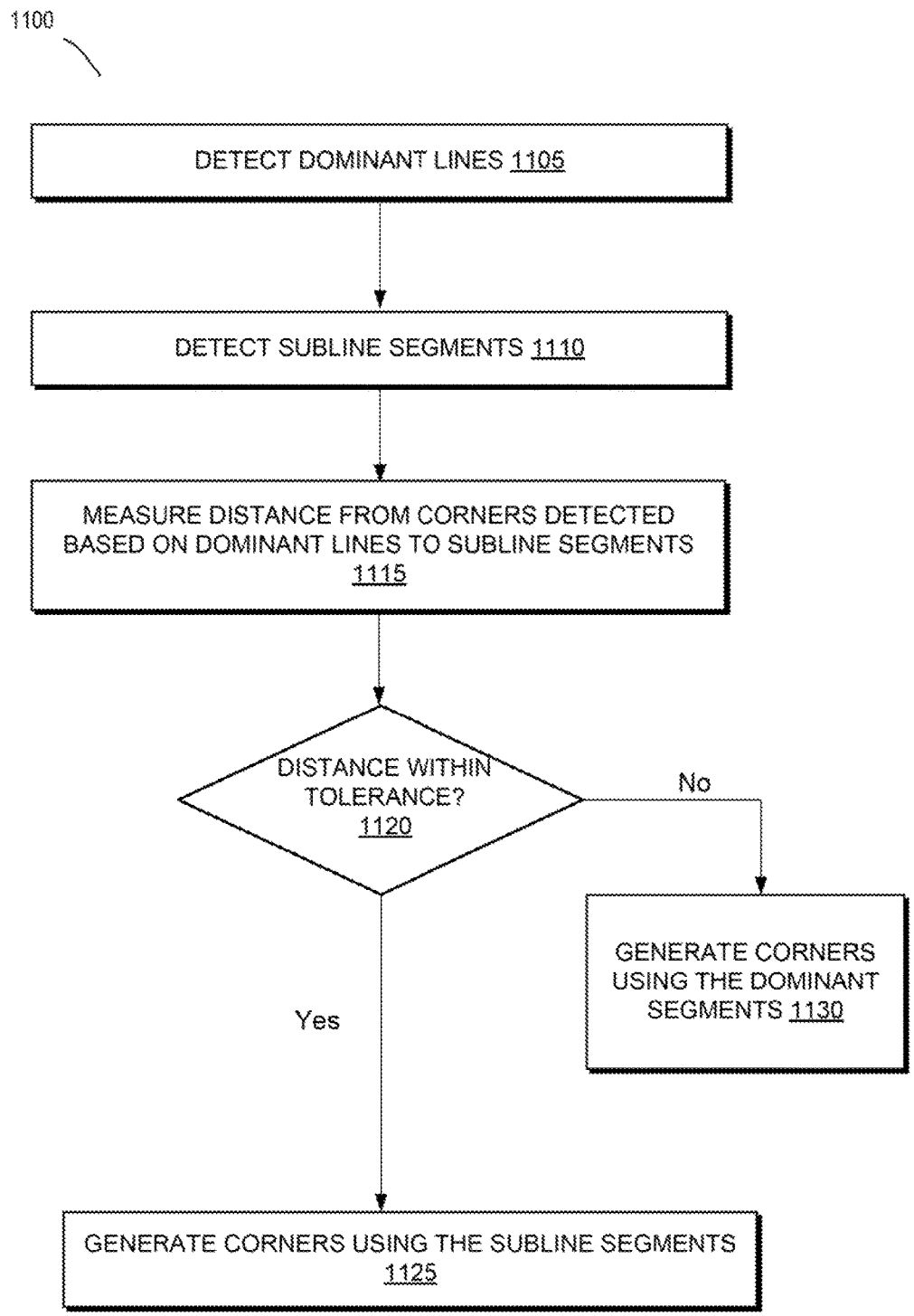
FIG. 11 is a flow diagram depicting steps to implement an example.

Turning now to the operation of the system 100, FIG. 11 is a flowchart of an example method 1100 in accordance with an example implementation. It should be readily apparent that the processes depicted in FIG. 11 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 100.

The illustrated process 1100 begins at block 1105. At 1105, a dominant line may be detected for each side of the projector display space. More specifically, a probabilistic-based Hough line detection algorithm to identify a line segment which matches closest to the projector display edge. Such line segment is defined as the dominant line, which is a line candidate generated by the best line-fitting with the majority of the edge points in the projector display space based on edge detection. In one implementation, a color intensity method may be used for edge detection. More specifically, sensors from the sensor bundle may be used for differentiating a color intensity of the projector display space from color intensity of an area outside the space. Histogram equalization may be performed on the regions of interest to obtain high and low thresholds for an edge detection algorithm (e.g., Canny edge detection). Upon running the edge detection algorithm, edge points indicating the perimeter of the projector display space may be extracted (e.g., edge points for all four sides of the space). As discussed earlier, a line fitting algorithm may be used for determining four fitted lines, which may be representative of the perimeter of the projector display space. The four fitted lines (e.g., the dominant lines) may be used to identify corners for the projector display space.

At block 1110, subline segments are detected. In particular, this process may involve identifying two subline segments for each edge. A subline segment may be defined as a line hitting close to the two corners on each side of the projector display space by fitting of edge points of a smaller region. The subline segments may be used because fitting a long edge to a single line may lose accuracy on either corner due to the nonexistence of straight lines under a system with optical distortion.

At block 1115, the computing system 100 may measure the distance from the corners identified by the dominant lines to the subline segments. At block 1120, the system checks whether this distance is within a predetermined tolerance level. If the distance is found to be within the tolerance, at block 1125, the corners are generated using the subline segments. If the distance is found to be outside of the tolerance, at block 1130, the corners are generated using the dominant lines.

Although the flowchart of FIG. 11 shows a specific order of performance of certain functionalities, method 1100 is not limited to that order. For example, the functionalities shown in succession in the flowchart may be performed in a different order, may be executed concurrently or with partial concurrence, or a combination thereof. In some examples, features and functionalities described herein in relation to FIG. 11 may be provided in combination with features and functionalities described herein in relation to any of FIGS. 1-10.

In the manner described, through use of examples of a computer system 100 in accordance with the principles disclosed herein, an additional touch sensitive display may be projected onto a touch sensitive surface (e.g., surface 202) to provide dual screen capability for a computing device (e.g., device 150).

While device 150 has been described as an all-in-one computer, it should be appreciated that in other examples, device 150 may further employ the use of more traditional user input devices such as, for example, a keyboard and a mouse. In addition, while sensors 164a. 164b. 164c. 164d within bundle 164 have been described as each representing a single sensor or camera, it should be appreciated that each of the sensors 164a, 164b, 164c, 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising: a support structure including a base, an upright member extending upward from the base, and a cantilevered top extending outward from the upright member and including a fold mirror and a plurality of sensors; a projector unit attachable to the upright member; a computing device attachable to the projector unit; and a touch sensitive mat communicatively coupled to the computing device, and wherein the computing device is to cause: the plurality of sensors to detect a dominant line for each side of a projector display area, each dominant line used to identify corners, the plurality of sensors to detect subline segments on each side of the projector display area, the projector unit to determine a distance between the corners identified by the dominant lines and the sub-line segments on each side, and the projector unit to generate the corners of the projector display area based on the distance.

2. A processor-implemented method of operating the system of claim 1 for generating corners of the projector display area, the method comprising: detecting the dominant line for each side of the projector display area, each dominant line used to identify the corners; detecting the subline segments on each side of the projector display area; determining the distance between the corners identified by the dominant lines and the sub-line segments on each side; and generating the corners of the projector display area based on the distance.

3. The method of claim 2, further comprising checking whether the distance is within a predetermined tolerance level.

4. The method of claim 3, wherein generating the corners based on the distance comprises generating the corners using the dominant lines if the distance is not within the predetermined tolerance level.

5. The method of claim 3, wherein generating the corners based on the distance comprises generating the corners using the subline segments if the distance is within the predetermined tolerance level.

6. The method of claim 2, wherein detecting the dominant line comprises using an enhanced Hough line detection to detect most probable line segment which matches closest to an edge of the projector display area.

7. The method of claim 6, wherein the edge of the display is identified by differentiating a color intensity of the projector display area from color intensity of an area outside the projector display area.

8. The method of claim 6, further comprising displaying an error message if the dominant lines may not be detected due to large object occlusion on the projector display area.

9. The method of claim 2, further comprising adjusting settings of associated units based on the generated corners of the projector display area.

10. The system of claim 1, wherein the plurality of sensors to detect the dominant line for each side of the projector display area comprises at least an RGB camera.

11. The system of claim 1, wherein the computing device is to use the generated corners of the projector display area to realign mapping between border of the touch sensitive mat and the projector display area.

12. The system of claim 11, wherein the computing device is to cause the projector to adjust settings based on the realigned mapping.

13. The system of claim 1, further comprising the computing device to:
check whether the distance is within a predetermined tolerance level;
generate the corners based on the distance by using the dominant lines when the distance is not within the predetermined tolerance level; and
generate the corners based on the distance by using the subline segments when the distance is within the predetermined tolerance level.

14. A system, comprising:
a support structure including a base, an upright member extending upward from the base, and a cantilevered top extending outward from the upright member and including a fold mirror and a plurality of sensors;
a projector unit attachable to the upright member;
a computing device attachable to the projector unit; and
a touch sensitive mat communicatively coupled to the computing device, and wherein the computing device is to cause;
the plurality of sensors to detect a dominant line for each side of the projector display area, each dominant line used to identify corners,
the plurality of sensors to detect subline segments on each side of the projector display area,
the projector unit to determine a distance between the corners identified by the dominant lines and the subline segments on each side, and
the projector unit to generate the corners of the projector display area based on the distance;
wherein the computing device is to cause the plurality of sensors to realign with the projector according to a comparison of the border of the image reflected on to the touch sensitive mat and a border of an image previously projected on to the touch sensitive mat.

15. The system of claim 14, further comprising the computing device to check whether the distance is within a predetermined tolerance level.

16. The system of claim 15, further comprising the computing device to generate the corners based on the distance by using the dominant lines when the distance is not within the predetermined tolerance level.

17. The system of claim 15, further comprising the computing device to generate the corners based on the distance by using the subline segments when the distance is within the predetermined tolerance level.

18. The system of claim 14, wherein the computing device is to use the generated corners of the projector display area to realign mapping between border of the touch sensitive mat and the projector display area.

19. A non-transitory machine-readable storage medium comprising instructions executable by a processing resource of a computing system to generate corners of a display area, the instructions executable to:

detect a dominant line for each side of a display area, each dominant line used to identify corners;

detect subline segments on each side of the display area;

determine a distance between the corners identified by the dominant lines and the sub-line segments on each side;

check whether the distance is within a predetermined tolerance level;

generate the corners of the display area using the subline segments when the distance is within the predetermined tolerance level; and generate the corners of the display area using the dominant lines when the distance is not within the predetermined tolerance level.

20. The non-transitory machine-readable storage medium comprising instructions of claim 19, further comprising instructions executable to cause a plurality of sensors to realign with a projector according to a comparison of a border of an image reflected onto a touch sensitive mat and a border of an image previously projected on to the touch sensitive mat.

\* \* \* \* \*

UNITED STATES PATENT AND TRADEMARK OFFICE
CERTIFICATE OF CORRECTION

PATENT NO. : 10,318,067 B2
APPLICATION NO. : 15/325532
DATED : June 11, 2019
INVENTOR(S) : Yun Tang et al.

It is certified that error appears in the above-identified patent and that said Letters Patent is hereby corrected as shown below:

In the Claims

In Column 14, Line 49, Claim 14, delete "cause;" and insert -- cause: --, therefor.

Signed and Sealed this
Seventeenth Day of September, 2019

Andrei Iancu
*Director of the United States Patent and Trademark Office*